United States Patent
Rönnings et al.

(10) Patent No.: US 12,415,151 B2
(45) Date of Patent: Sep. 16, 2025

(54) FILTER HOUSING AND AN AIR FILTER SYSTEM

(71) Applicant: VOLVO TRUCK CORPORATION, Gothenburg (SE)

(72) Inventors: Hans Rönnings, Gothenburg (SE); Carl Löwstedt, Onsala (SE); Mikael Karlsson, Gothenburg (SE); Sophie Girolami, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/003,051

(22) PCT Filed: Jul. 3, 2020

(86) PCT No.: PCT/EP2020/068884
§ 371 (c)(1),
(2) Date: Dec. 22, 2022

(87) PCT Pub. No.: WO2022/002417
PCT Pub. Date: Jan. 6, 2022

(65) Prior Publication Data
US 2023/0302390 A1      Sep. 28, 2023

(51) Int. Cl.
*B01D 46/24*      (2006.01)
*B01D 46/42*      (2006.01)

(52) U.S. Cl.
CPC ..... *B01D 46/2414* (2013.01); *B01D 46/4236* (2013.01); *B01D 2279/60* (2013.01)

(58) Field of Classification Search
CPC ........... B01D 46/2414; B01D 46/4236; B01D 2279/60; B01D 46/0004; B01D 46/0047
(Continued)

(56) References Cited

U.S. PATENT DOCUMENTS

| 5,106,397 A | * | 4/1992 | Jaroszczyk ...... | F02M 35/02483 55/306 |
| 9,682,341 B2 | | 6/2017 | Williams et al. | |

(Continued)

FOREIGN PATENT DOCUMENTS

| EP | 2364763 A1 | 9/2011 |
| EP | 2247364 B1 | 4/2014 |

(Continued)

OTHER PUBLICATIONS

International Search Report and Written Opinion of the International Searching Authority in corresponding International Application No. PCT/EP2020/068884 mailed Sep. 3, 2020 (14 pages).

(Continued)

*Primary Examiner* — Jennifer Dieterle
*Assistant Examiner* — Qianping He
(74) *Attorney, Agent, or Firm* — Venable LLP; Jeffri A. Kaminski (57) ABSTRACT

An air filter housing includes an inner housing space adapted to receive an air filter element. The air filter housing includes a first end and a second end located axially opposite the first end in relation to the inner housing space, and an outlet channel path extending from the inner housing space and out from the second end, the outlet channel path having a length X m, the length X m being adapted to stabilize a noise having a wavelength of Y m travelling through the outlet channel path towards the inner housing space, wherein the length X m is related to the wavelength Y m according to the following relationship: Y/16<X<Y/8.

10 Claims, 3 Drawing Sheets

(58) Field of Classification Search
USPC .......................................................... 55/497
See application file for complete search history.

(56) References Cited

U.S. PATENT DOCUMENTS

| | | | |
|---|---|---|---|
| 10,556,199 | B2 | 2/2020 | Luchesi De Almeida et al. |
| 2005/0061292 | A1* | 3/2005 | Prellwitz ............... B01D 46/24 123/198 E |
| 2006/0157403 | A1 | 7/2006 | Harder et al. |
| 2009/0249754 | A1 | 10/2009 | Amirkhanian et al. |
| 2013/0042587 | A1* | 2/2013 | Traub ................ B01D 46/0004 55/385.3 |
| 2014/0223874 | A1 | 8/2014 | Kaufmann et al. |
| 2016/0102637 | A1 | 4/2016 | Desjardins |
| 2016/0220935 | A1 | 8/2016 | Ruhland et al. |
| 2018/0257011 | A1 | 9/2018 | Boden et al. |
| 2018/0369732 | A1* | 12/2018 | Karlsson ............ B01D 46/0047 |
| 2019/0046904 | A1 | 2/2019 | Noren et al. |

FOREIGN PATENT DOCUMENTS

| | | |
|---|---|---|
| EP | 3352880 A1 | 8/2018 |
| GB | 2450735 A | 1/2009 |
| WO | 2013063497 A2 | 5/2013 |
| WO | 2017050365 A1 | 3/2017 |
| WO | 2017050366 A1 | 3/2017 |
| WO | 2017102027 A1 | 6/2017 |
| WO | 18111822 A1 | 6/2018 |
| WO | 2019238212 A1 | 12/2019 |

OTHER PUBLICATIONS

International Search Report and Written Opinion in corresponding International Application No. PCT/EP2020/054659 mailed Oct. 21, 2020 (13 pages).
International Search Report and Written Opinion in corresponding International Application No. PCT/EP2020/054655 mailed Oct. 22, 2020 (13 pages).
Second Written Opinion of the International Preliminary Examining Authority in corresponding International Application No. PCT/EP2020/054659 mailed Jan. 28, 2022 (5 pages).
International Preliminary Report on Patentability in corresponding International Application No. PCT/EP2020/054655 mailed Feb. 14, 2022 (6 pages).
International Preliminary Report on Patentability in corresponding International Application No. PCT/EP2020/068884 mailed May 16, 2022 (8 pages).
International Preliminary Report on Patentability in corresponding International Application No. PCT/EP2020/054659 mailed May 23, 2022 (6 pages).
Non Final Office Action dated Nov. 15, 2024 in corresponding U.S. Appl. No. 17/904,272, 19 pages.
Non Final Office Action dated Oct. 30, 2024 in corresponding U.S. Appl. No. 17/904,262, 8 pages.
Final Office action dated Mar. 14, 2025 in corresponding U.S. Appl. No. 17/904,262, 9 pages.
Final Office Action dated Apr. 29, 2025 in corresponding U.S. Appl. No. 17/094,272, 22 pages.
Notice of Allowance dated Jul. 15, 2025 in corresponding U.S. Appl. No. 17/904,262, 7 pages.

* cited by examiner

FILTER HOUSING AND AN AIR FILTER SYSTEM

CROSS-REFERENCE TO RELATED APPLICATIONS

This application is a U.S. National Stage application of PCT/EP2020/068884, filed Jul. 3, 2020 and published on Jan. 6, 2022, as WO 2022/002417, all of which is hereby incorporated by reference in its entirety.

TECHNICAL FIELD

The present disclosure relates to an air filter housing, and an air filter system comprising an air filter housing and an air filter element. The air filter element may alternatively be called a filter cartridge, a filter module or a filter insert. The invention further relates to an air induction system, an internal combustion engine system, and a vehicle comprising such air filter system.

BACKGROUND

Filters are used in many places in a vehicle. It is e.g. well known to provide an internal combustion engine with an air filter for cleaning intake air for use in the internal combustion engine. There may also be other users of clean air in a vehicle which needs clean air, components such as a compressor for a brake system (brake compressors). Other filter types include for example oil filters. An air filter in a vehicle is replaced on a regular basis to keep the performance of the filter and of the devices receiving the filtered air at a desired level. The same is true also for other filter types filtering other fluids. The filter can be designed in many different shapes and configurations.

To avoid noise in the air intake system of a vehicle the users of clean air are often equipped with devices that reduce noise e.g. resonators. These need space in the already limited space of the vehicle. It is also difficult to find space to put separate air filters for all components needing clean air in the vehicle.

A manner in which these functions have been combined into one installation is disclosed in US 2005/0061292 A1. This document discloses an intake air filter for a combustion engine, especially in a motor vehicle. The filter comprises a filter housing having a raw air inlet, a pure air outlet, and an annular filter which is arranged in the filter housing and through which air can flow in a radial manner from its outside towards its inside. The filter comprises a first end disk on the axial end thereof, wherein the disk comprises an opening by which means the pure air outlet communicates with the inside of the annular filter. The aim of the device is to reduce the influence of a secondary air induction on the fresh air supply of the internal combustion engine. To this end, the filter housing comprises a secondary air outlet, on the pure air side, and the annular filter comprises a second end disk on an axial end opposing the first end disk. The second end disk comprises one smaller opening by which the secondary air outlet communicates with the inside of the annular filter.

WO 2017/102027 A1 disclose a filter element having a tubular shape defining an inner space, a first outlet in communication with the inner space and a second in communication with the inner space, wherein the second outlet has an offset position in relation to the first outlet in a transversal direction of the filter element.

Known systems are thus rather complex and bulky, leading to extended assembly time and inefficient use of space. The bulkiness may also have a negative effect on noise optimized tuning of the intake system.

SUMMARY

It is an object of the present disclosure to at least to some extent alleviate the shortcomings discussed above in relation to known air filter systems, and to improve an air filter housing and an air filter system, especially for noise and space related issues.

According to a first aspect of the present invention, an air filter housing having an inner housing space adapted to receive an air filter element is provided. The air filter housing comprises a first end and a second end located axially opposite the first end in relation to the inner housing space, and an outlet channel path extending from the inner housing space and out from the second end, the outlet channel path having a length X m, the length X m being adapted to stabilize a noise having a wavelength of Y m travelling through the outlet channel path towards the inner housing space, wherein the length X m is related to the wavelength Y m according to the following relationship:

$$Y/16 < X < Y/8.$$

That is, the length X is larger than a $16^{th}$ of the wavelength (Y/16) and smaller than an $8^{th}$ of the wavelength (Y/8). An air filter housing of this kind proves advantageous in that it may provide an improved acoustic response of the total filter system as the noise travelling through the outlet channel path is reduced. The air filter housing is also simple and compact in its design, whereby its need of space in its end using facility, such as a vehicle, is reduced.

It should be understood that the outlet channel path is a channel path configured to supply filtered air discharged from the air filter housing. Thus, during operation, filtered air is transported from the air filter housing via the outlet channel path to a filtered air-using equipment. The outlet channel path may be defined as the path which the filtered air, in operation, travels from air filter housing to the filtered air-using equipment. The inventors have realised that there is a relation between the length X of the outlet channel path and the generated noise travelling in the opposite direction of the filtered air in the outlet channel path. The noise is typically originating from the filtered air-using equipment, and travels with a certain wavelength Y to the air filter housing via the outlet channel path. Thus, by adapting the length X of the outlet channel path the desired noise can be reduced as the wavelength Y of the noise is stabilised depending on said length X. The wavelength Y is related to the frequency Z Hz of the noise by the speed of sound v m/s (typically 343 m/s in dry air at 20° C.), why the length X may be expressed in terms of frequency Z Hz, or top frequency, instead. For example, for reducing a noise with a frequency, or peak frequency, Z of 250 Hz, a length X of the outlet channel is preferably set to $$X = Y/12 = (v/Z)/12 = 0.114 \text{ m} = 114 \text{ mm}.$$

Thus, a length of X of 114 mm+/−10 mm has been found effective for balancing a noise with a peak frequency Z of 250 Hz.

According to at least one example embodiment, the air filter housing comprises an outlet pipe extending from an outer surface of the second end, and the outlet channel path is extending from an inlet of the outlet pipe to an outlet of the outlet pipe.

The inlet of the outlet pipe may e.g. be arranged in the inner housing space, or at a boundary to the inner housing space. The outlet of the outlet pipe may e.g. end at the filtered air-using equipment. In other words, the length X of the outlet channel path is the same as the length of the outlet pipe.

According to at least one example embodiment, the outlet channel path has a trajectory following a centre axis of the outlet channel path, wherein the length of the outlet channel path is measured as the length of the trajectory of the centre axis.

Thus, a well-defined length of the outlet channel path is provided. For example, the trajectory may follow, and be defined of, the outlet pipe.

According to at least one example embodiment, the outlet channel path is configured to convey clean air to an auxiliary equipment, such as e.g. a brake compressor, and wherein the noise traveling through the outlet channel path originates from such auxiliary equipment.

In other words, the previously mentioned filtered air-using equipment may be an auxiliary equipment, such as the brake compressor. The air filter housing may further have an engine outlet arranged at the first end of the air filter housing. Thus, for such embodiments, the air filter housing comprises a first housing outlet being the engine outlet at the first end of the air filter housing, and comprises a second housing outlet being an auxiliary equipment outlet at the second end of the air filter housing. The engine outlet may e.g. be located coaxially with the air filter housing, and/or the auxiliary equipment outlet may be located offset to the center axis of the air filter housing and engine outlet.

Thus, the outlet channel path extends from the air filter housing, such as from the inner housing space or the second end of the air filter housing, to the auxiliary equipment. The noise from the brake compressor has been found particularly efficient to reduce by adapting the length X of the outlet channel path according to the previously mentioned relation.

According to at least one example embodiment, the air filter housing has a tubular shape.

Such shape is advantageous as it provides a simple and compact design.

According to at least one example embodiment, the air filter housing has a cross-sectional shape which has a first extension in a first direction and a second extension in a second direction, wherein said first extension is greater than said second extension, said second extension preferably being perpendicular to said first extension and that said cross-sectional shape is generally elliptical.

According to at least one example embodiment, the air filter housing further comprises a housing lid, the housing lid comprising the second end of the air filter housing and encompassing at least a portion of the outlet channel path.

Hereby, an air filter element may easily be inserted and removed from the inner housing space of the air filter housing. For embodiments including the outlet pipe, the outlet pipe is preferably attached to the housing lid.

According to a second aspect of the present invention, an air filter system comprising an air filter element, and an air filter housing is provided. The air filter housing comprises an inner housing space adapted to, in use, hold the air filter element, the air filter housing further comprising a first end and a second end located axially opposite the first end in relation to the inner housing space, and an outlet channel path, in use, extending from the air filter element and out from the second end, the outlet channel path having a length X m, the length X m being adapted to stabilize a noise having a wavelength of Y m travelling through the outlet channel path towards the inner housing space, wherein the length X m is related to the wavelength Y m according to the following relationship:

$$Y/16 < X < Y/8$$

Effects and features of this second aspect of the invention are largely analogous to those described above in connection with the first aspect of the invention. Embodiments mentioned in relation to the first aspect of the invention are largely compatible with the second aspect of the invention, of which some are exemplified below (typically without repeating the advantageous effects again).

Thus, in use, the outlet channel path extends from an outer surface, or internally of, the air filter element and out from the second end, wherein the extension of the outlet channel path outwards from the second end has already been described in relation to the first aspect of the invention, which embodiments thereof are applicable also for the second aspect of the invention.

It should be understood that the term "in use" refers to a configuration in which the air filter element is installed, i.e. held or housed, in the air filter housing, which may also be referred to as an assembled state. For example, such configuration is prevailing during operation of the air filter system, i.e. when the air filter system is operated to filter air, but also in the assembled state when the air filter element is simply held in the air filter housing without pending operation of filtering air.

According to at least one example embodiment, the air filter element comprises a filter outlet, in use, forming at least a part of the outlet channel path.

The filter outlet may preferably be an auxiliary equipment outlet arranged to, in use, communicate with the auxiliary equipment outlet of the air filter housing.

According to at least one example embodiment, the air filter element comprises a first end and a second end located opposite to the first end in relation to a longitudinal direction of the air filter element. Thus, the air filter element is configured for axial insertion into the air filter housing with the first end leading the axial insertion. In other words, in use, the first end of the air filter housing is arranged adjacent to the first end of the air filter element, and the second end is arranged adjacent to the second end of the air filter element. The air filter element may furthermore comprise an engine outlet located in the first end of the air filter element and being configured to communicate with the engine outlet of the air filter housing. Hereby, the engine outlet of the air filter element is coaxial and aligned with the engine outlet of the air filter housing, for conveying filtered air to the engine or internal combustion engine, and the above mentioned filter outlet is coaxial and aligned with the auxiliary equipment outlet, or the inlet of the outlet pipe, for conveying filtered air to the auxiliary equipment. Thus, the filter outlet of the air filter element may be referred to as an auxiliary outlet of the air filter element. The air filter element may have a tubular shape defining an inner filter space in communication with the engine outlet and auxiliary equipment outlet.

According to at least one example embodiment, the air filter element has a first end panel at the first end and a second end panel at the second end, wherein the engine outlet is located in the first end panel. This provides a simple design and for enabling a proper sealing effect between the air filter element and air filter housing when installed therein. The first end panel may be arranged to block any filtered fluid to exit the air filter element axially through the first end panel other than through the engine outlet. This provides for a certain air flow and for a desired flow and filtration performance. According to at least one example embodiment, the auxiliary outlet is located in the second end panel. The acoustic response of the air filter element is improved, as well as a minimising of any interference between the respective flows of fluid through the engine and auxiliary outlets is achieved. The second end panel may be arranged to block any filtered fluid to exit the air filter element axially through the second end panel other than through the auxiliary outlet. This enables a correct fluid flow without any leakage, and thereby an improved filtering performance.

According to at least one example embodiment, the air filter system comprises an internal pipe arranged to, in use, extend internally of the air filter element, and an outlet pipe extending from an outer surface of the second end of the air filter housing, such that, in use, the outlet channel path is extending from an inlet of the internal pipe, via the filter outlet, to an outlet of the outlet pipe.

Hereby, at least a portion of the air filter element defines at least a portion of the outlet channel path. The inlet of the internal pipe may e.g. be arranged in the inner filter space. Thus, the outlet channel path may be defined by the internal pipe and the outlet pipe, such that the length X of the outlet channel path is equal to the length of the internal pipe and the outlet pipe (e.g. a trajectory following a centre axis of the internal pipe and outlet pipe, respectively). Example embodiments of the outlet pipe mentioned in relation to the first aspect of the invention is also applicable for the air filter system of the second aspect of the invention.

According to at least one example embodiment, the filter outlet comprises a sealing arrangement forming an opening of the air filter element. The opening may have an axial extension and may thus form at least a portion of the outlet channel path. Alternatively, an outlet of the internal pipe is, in use, arranged to end into the inlet of the outlet pipe forming an interface between the internal pipe and the outlet pipe, typically with a sealing arrangement surrounding the interface.

According to at least one example embodiment, at least one end portion of the internal pipe has a sinusoidal shaped portion.

Such shape is advantageous as it reduced noise as air travels along and edge portion and into or out of the internal pipe via the inlet and outlet of the internal pipe, respectively. It should be understood that the internal pipe typically has two oppositely arranged end portion, a first end portion comprising the inlet of the internal pipe, and a second end portion comprising the outlet of the internal pipe. Thus, and edge portion surrounding the inlet and/or outlet of the internal pipe may be sinusoidal. According to at least one example embodiment, the inlet of the outlet pipe is correspondingly shaped to the outlet of the internal pipe. Thus, for embodiments in which the edge portion surrounding the outlet of the internal pipe is sinusoidal, and edge portion surrounding the inlet of the outlet pipe may be sinusoidal.

According to at least a third aspect of the invention, an air induction system for a vehicle having an engine is provided. The air induction system comprises an air filter system according to the second aspect of the invention, and an auxiliary equipment, such as e.g. a brake compressor, wherein the outlet channel path extends from the air filter element to the auxiliary equipment.

Effects and features of this third aspect of the invention are largely analogous to those described above in connection with the first and second aspects of the invention. Embodiments mentioned in relation to the first and second aspects of the invention are largely compatible with the third aspect of the invention, of which some are exemplified below (typically without repeating the advantageous effects again).

The air induction system may further comprise an acoustic resonator arranged between the auxiliary equipment and the air filter system.

For such embodiments, the outlet channel path typically extends from the air filter element to an inlet of the resonator.

According to at least one example embodiment, the auxiliary equipment has an inlet conduit, and the radial cross section of the outlet channel path is equal to the radial cross section of the inlet conduit.

Hereby, connection between the components is facilitated. For embodiments with an outlet pipe, the radial cross section of the outlet the outlet pipe is equal to the radial cross section of the inlet conduit.

According to at least a fourth aspect of the invention, an internal combustion engine system is provided. The internal combustion engine system comprises an air filter system according to the second aspect of the invention, or an air induction system according to the third aspect of the invention.

According to at least a fifth aspect of the invention, a vehicle comprising an internal combustion engine system according to the fourth aspect of the invention is provided.

In general, it should be understood that the auxiliary equipment may be referred to as an auxiliary component, such as e.g. the brake compressor. According to at least one example embodiment, any outlets of the air filter element and/or air filter housing has a generally cylindrical cross-section, i.e. are round. For example, the filter outlet, or the auxiliary outlet of the air filter element has a generally cylindrical cross-section. Thus, typically the internal pipe and the outlet pipe have generally cylindrical cross-sections. However, the cross-section of the internal pipe and/or the outlet pipe may have a cross-section which differs from the cylindrical cross-section. For example, the outlet pipe may have at least a portion with a cross-section which is rectangular, e.g. an intermediate portion, wherein at least the end portion of the outlet pipe which faces the air filter element (i.e. which houses the inlet of the outlet pipe) have a cylindrical cross-section. This enables easy manufacturing and easy connection to adjoining piping.

According to at least one example embodiment the air filter element comprises a filter material body, which preferably is made of a material chosen from the group of: paper and cellulose. These materials are common materials and enables low manufacturing costs. According to at least one example embodiment the air filter element is adapted to be removably arranged in the air filter housing. For example, the inner housing shape of the air filter housing is adapted to match to an outer shape of the air filter element. This provides for the air filter housing to correspond to the air filter element, such that a fluid to be filtered is generally evenly spread between the air filter housing and the air filter element to fully utilize the filtering operation of the air filter element.

According to at least one example embodiment the air filter housing comprises a housing inlet located in an envelope surface of the air filter housing. This enables a compact design of the air filter housing.

According to at least one alternative aspect, the length X mm is related to the peak frequency Z Hz according to $Z=k1*X$ where k1 is between 2 and 2.4. According to at least one alternative example embodiment, the frequency Z Hz, or top frequency Z Hz of the noise is related to the length X of the outlet channel path according to the following equation:

$$Z = k*(X+/-C)Z$$

where k is between 1 and 10, preferably between 1 and 5, such as e.g. about 2 or 2.2, and/or C is between 0 and 30 mm, preferably between 0 and 15 mm, such as e.g. 10 mm, and/or Z is between 1 and 2, preferably 1. Such setting of the constants k, C and Z in the equation have been proved beneficial for reducing the noise.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
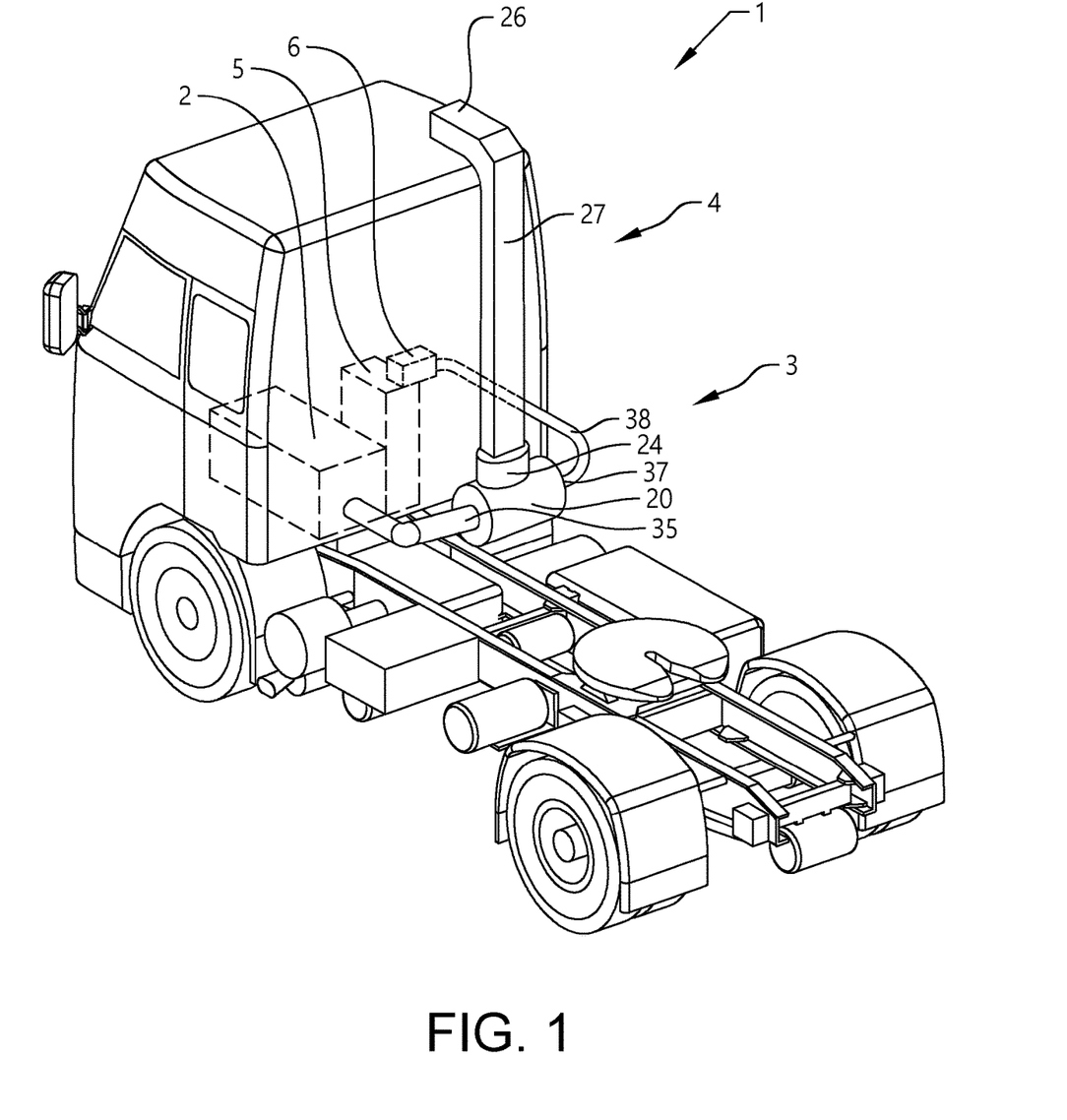
FIG. 1 is a view from behind of a vehicle carrying an air induction system comprising an air filter system with an air filter housing and an air filter element according to at least one example embodiment of the invention.

With reference to FIG. 1 a heavy duty truck 1 is disclosed for which an internal combustion engine system 2 of a kind disclosed in the present disclosure is advantageous. However, the internal combustion engine system 2 may well be implemented also in other types of vehicles, such as in busses, in light-weight trucks, passenger cars, marine applications etc. The internal combustion engine system 2 may be e.g. a diesel engine, which as such may be running on several different types of fuel, such as diesel or dimethyl ether, DME. Other fuel types are well suited, as well as hybrid systems. The internal combustion engine system 2 is provided with an air induction system 3 including an air intake system 4 comprising an air filter system 20 with an air filter element 50 housed in an air filter housing 30 (shown in e.g. FIG. 2), as disclosed herein.

The air intake system 4 further comprises an air intake pipe 27 located upstream of the air filter system 20, configured to draw air from the ambient by an air intake 26. The ambient air is most often in need of filtration before being directed towards an inlet of the internal combustion engine system 2 and/or any auxiliary use. Downstream the air intake 26 and air intake pipe 27 is a housing inlet 24 arranged in the air filter housing 30 to supply air to the air filter element 50. The air is then filtered by the air filter element 50 and further directed through a first housing outlet 35, or engine outlet 35, and towards the internal combustion engine system 2. The air filter system 20 may further provide filtered air to an auxiliary equipment 5, e.g. the brake compressors 5. In such cases the air filter housing 30 further comprises a second housing outlet 37 and an outlet pipe 38 connecting the air filter system 20 with the auxiliary equipment 5. The air filter system 20 is located in a lower region of the vehicle 1 and the air intake 26 in a higher region of the vehicle 1. In the depicted embodiment the air filter system 20 is located directly behind the vehicle cab, whereas the air intake 26 is located on top of the vehicle cab at a rear end thereof. The air intake pipe 27 is located at the rear end in a generally vertical position of the vehicle cab, and the air filter housing 30 is located having its longitudinal, or axial, direction transversal to the driving direction of the vehicle 1. The air induction system 4 may further comprise an acoustic resonator 6 arranged between the air filter system 20 and the auxiliary equipment 5. In such cases, the outlet pipe 38 ends in the resonator 6, wherein the resonator 6 is fluidly connected to the auxiliary equipment 5.

Figure 2:
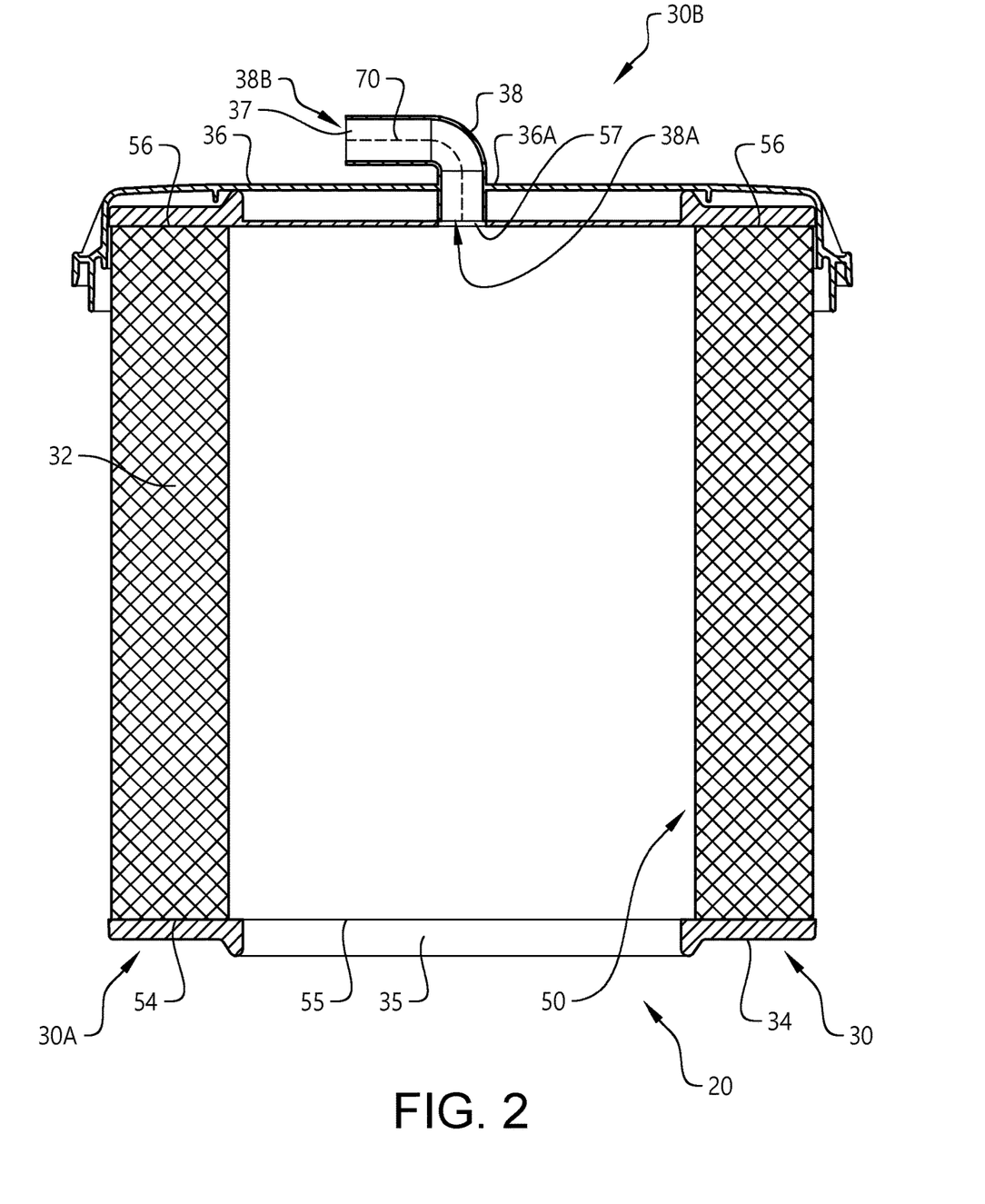
FIG. 2 is a length-wise cross-section of an air filter system comprising an air filter housing and an air filter element according to at least one example embodiment of the invention.

In FIG. 2, air filter system 20 is shown. The air filter system 20 generally comprises a tubular air filter housing 30 and a tubular air filter element 50. The air filter housing 30 comprises an inner housing space 32 in which the air filter element 50 is arranged. Thus, in FIG. 2, the air filter system 20 is shown in an assembled state. In the following, the air filter housing 30 will be described as part of the air filter system 20, which should not be considered as limiting to the invention, as the invention is applicable to an air filter housing 30 without the air filter element 50 installed therein. Moreover, the air filter housing 30 and the air filter element 50 may be shaped differently to the tubular shapes shown in FIG. 2.

The air filter housing 30 comprises a first housing end 34 and a second housing end 36 located axially opposite the first housing end 34 in relation to the inner housing space 32. As seen in FIG. 2, the air filter housing 30 comprises two parts, a first housing part 30A including the first housing end 34 and being arranged to house the majority of the air filter element 50, and a second housing part 30B including the second housing end 36, the second housing part 30B being an air filter housing lid 30B. The air filter housing 30 comprises a first housing outlet 35, being an engine outlet 35, arranged in the first housing end 34 for providing filtered air to the engine, or internal combustion engine system 2 as shown in FIG. 1, and a second housing outlet 37, being an auxiliary equipment outlet 37, arranged at the second housing end 36 for providing filtered air to the auxiliary equipment, e.g. the auxiliary equipment 5 shown in FIG. 1.

The air filter element 50 comprises a first filter end 54 and a second filter end 56 located opposite to the first filter end 54 in relation to a longitudinal direction of the air filter element 50. The air filter element 50 is configured for axial insertion into the air filter housing 30 with the first filter end 54 leading the axial insertion. Thus, the first housing end 34 is arranged adjacent to the first filter end 54, and the second housing end 36 is arranged adjacent to the second filter end 56 when the air filter element 50 is housed in the inner housing space 32 as seen in FIG. 2. The air filter element 50 comprises a first filter outlet 55, being an engine outlet 55, located in the first filter end 54 and being configured to communicate with the first housing outlet 35 for providing filtered air to the engine, or internal combustion engine system. Moreover, the air filter element 50 comprises a second filter outlet 57, being an auxiliary equipment outlet 57, located in the second filter end 56 and being configured to communicate with the second housing outlet 37 for providing filtered air to the auxiliary equipment. Hereby, the engine outlet 55 of the air filter element 50 is coaxial and aligned with the engine outlet 35 of the air filter housing 30.

As indicated in FIG. 2 an outlet channel path 70, indicated by the trajectory 70, extends from the inner housing space 32, and the air filter element 50 therein, and out from the second end 36 of the air filter housing lid 30B. In the example embodiment of FIG. 2, the air filter housing 30 comprises an outlet pipe 38 extending from an outer surface 36A of the second end 36, the outlet pipe 38 having an inlet 38A arranged and configured for receiving filtered air from the air filter element 50. Thus, the auxiliary equipment outlet 57 of the air filter element 50 is coaxial and aligned with the inlet 38 of the outlet pipe 38. The outlet pipe 38 further comprises an outlet 38B for conveying air to the auxiliary equipment, e.g. the brake compressors. Thus, the outlet channel path 70 extends from the inlet 38A to the outlet 38B of the outlet pipe 38. In other words the length of the outlet channel path 70 corresponds to the length of the outlet pipe 38, or to the trajectory 70 following a centre axis of the outlet pipe 38. As the inlet 38A of the outlet pipe 38 ends in the second filter outlet 57, the outlet channel path 70 may alternatively be considered to extend from the air filter element 50, and more specifically the second filter outlet 57, to the outlet 38B of the outlet pipe 38. In other words, the length of the outlet channel path 70 corresponds to the length of the outlet pipe 38 and any axial extension of the second filter outlet 57. Thus, the second filter outlet 57 may form at least a part of the outlet channel path 70.

According to the invention, the outlet channel path 70 has a length X m which is adapted to stabilize a noise having a wavelength of Y m travelling along the outlet channel path 70 (in FIG. 2 thus being a noise travelling through the outlet pipe 38, from the auxiliary equipment such as e.g. the brake compressor) towards the inner housing space 32. The inventors have found that the if the length X m is adapted to the wavelength of Y m according to the following relationship:

$$Y/16 < X < Y/8$$

an advantageous reduction of noise can be achieved.

Figure 3:
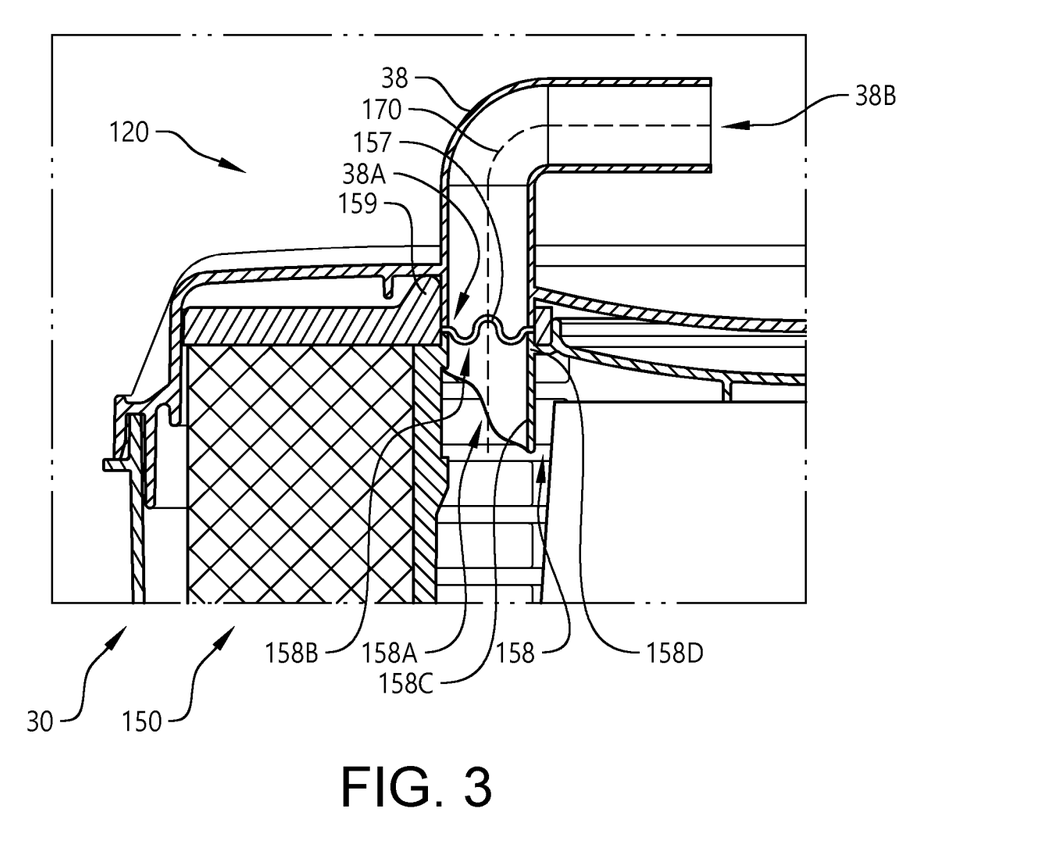
FIG. 3 is an enlarged detailed cross-section of an air filter system comprising an air filter housing and an air filter element according to at least one example embodiment of the invention.

FIG. 3 shows a detailed view of an alternative example embodiment of an air filter system 120 comprising an air filter element 150 and an air filter housing 30. The air filter housing 30 is in principle the same as the air filter housing 30 of FIG. 2 and is not described here again but the same references are used for like features. The air filter element 150 is the same as the air filter element 50 of FIG. 2 except for the configuration of the second filter outlet 57, 157. In the example embodiment of FIG. 3, the air filter element 150 comprises an internal pipe 158 extending from the second filter outlet 157 and axially into the air filter element 150, such that an inlet 158A of the internal pipe 158 is arranged internally of the air filter element 150. Moreover, as can be seen in FIG. 3, the second filter outlet 157 is arranged with a sealing 159 surrounding the second filter outlet 157 configured to seal the air filter housing 30 to the air filter element 150, and more specifically to seal the connection between the outlet pipe 38 and the second filter outlet 157. As also seen in FIG. 2 the second filter outlet 157, and the sealing 159, encompasses a portion of the internal pipe 158, and a portion of the outlet pipe 38, such that the outlet channel path 170 is defined from the inlet 158A of the internal pipe 150 to the outlet 38B of the outlet pipe 38. Alternatively, the internal pipe 150 may be arranged distant from the outlet pipe 38, such that a part of the second filter outlet 157 (and thus a part of the sealing 159) forms a part of the outlet channel path. Thus, the outlet channel path may be extending from the inlet 158A of the internal pipe 158, via the second filter outlet 157 and its axial extension A, to an outlet 38B of the outlet pipe 38. Thus, the outlet channel path 70, 170 comprises at least the outlet pipe 38.

As seen in FIG. 3, the inlet 158A of the internal pipe 158 may be inclined relative the longitudinal direction of the air filter element 150 and the air filter housing 30. Hereby, filtered air can be drawn internally of the air filter element 150 from a desired location. Typically, for such inclined inlet 158A of the internal pipe 158, the outlet channel path 170 begins at a radial cross section axially located at the outermost edge portion of the internal pipe 158.

According to at least one example embodiment, at least one end portion 158C, 158D of the internal pipe 158 has a sinusoidal shaped portion. As seen in FIG. 3, a first end portion 158C comprising the inlet 158A of the internal pipe 158, and/or a second end portion 158D comprising an outlet 158B of the internal pipe, has a wavy or sinusoidal shaped portion. In other words, an edge portion surrounding the inlet 158A and/or outlet 158B of the internal pipe 158 may be wavy or sinusoidal. Moreover, the inlet 38A of the outlet pipe 38 may be correspondingly shaped to the outlet 158B of the internal pipe 158. Thus, for embodiments in which the edge portion surrounding the outlet 158B of the internal pipe 158 is wavy or sinusoidal, and edge portion surrounding the inlet 38A of the outlet pipe 38 may be wavy or sinusoidal.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

The invention claimed is:

1. An air filter system comprising:
    an air filter housing having an inner housing space adapted to receive an air filter element, the air filter housing comprising a first end and a second end located axially opposite the first end in relation to the inner housing space, an outlet channel path extending from the inner housing space and out from the second end, the air filter element comprises a filter outlet, in use, forming at least a part of the outlet channel path, an internal pipe arranged to, in use, extend internally of the air filter element, and an outlet pipe extending from an outer surface of the second end of the air filter housing, such that, in use, the outlet channel path is extending from an inlet of the internal pipe, via the filter outlet, to an outlet of the outlet pipe, at least one end portion of the internal pipe has a wavy or sinusoidal shaped portion, wherein
    the outlet channel path has a length X m, the length X m being adapted to stabilize a noise having a wavelength of Y m travelling through the outlet channel path towards the inner housing space, wherein the length X m is related to the wavelength Y m according to the following relationship:

$$Y/16 < X < Y/8$$

wherein the outlet channel path is configured to convey clean air to an auxiliary equipment, and
    wherein the noise traveling through the outlet channel path originates from such auxiliary equipment.

2. The air filter housing according to claim 1, wherein the outlet channel path has a trajectory following a center axis of the outlet channel path, wherein a length of the outlet channel path is measured as the length of the trajectory of the center axis.

3. The air filter housing according to claim 1, wherein the wavelength Y m of the noise is defined by a top frequency, or peak frequency, of the noise traveling through the outlet channel path.

4. The air filter housing according to claim 1, wherein the air filter housing has a tubular shape.

5. The air filter housing according to claim 1, further comprising a housing lid, the housing lid comprising the second end of the air filter housing and encompassing at least a portion of the outlet channel path.

6. An air induction system for a vehicle having an engine, the air induction system comprising: the air filter system according to claim 1, and the auxiliary equipment, wherein the outlet channel path extends from the air filter element and the auxiliary equipment.

7. The air induction system according to claim 6, further comprising an acoustic resonator arranged between the auxiliary equipment and the air filter system.

8. An internal combustion engine system comprising the air filter system according to claim 1.

9. A vehicle comprising the internal combustion engine according to claim 8.

10. An air filter system comprising:
an air filter housing having an inner housing space adapted to receive an air filter element, the air filter housing comprising a first end and a second end located axially opposite the first end in relation to the inner housing space, an outlet channel path extending from the inner housing space and out from the second end, the air filter element comprises a filter outlet, in use, forming at least a part of the outlet channel path, an internal pipe arranged to, in use, extend internally of the air filter element, and an outlet pipe extending from an outer surface of the second end of the air filter housing, such that, in use, the outlet channel path is extending from an inlet of the internal pipe, via the filter outlet, to an outlet of the outlet pipe, at least one end portion of the internal pipe has a wavy or sinusoidal shaped portion, wherein the outlet channel path has a length X m, the length X m being adapted to stabilize a noise having a wavelength of Y m travelling through the outlet channel path towards the inner housing space, wherein the outlet channel path is configured to convey clean air to an auxiliary equipment, and wherein the noise traveling through the outlet channel path originates from such auxiliary equipment.

* * * * *